United States Patent [19]

Cululi et al.

[11] 3,981,567

[45] Sept. 21, 1976

[54] BICYCLE FRAME MOUNTED REAR VIEW MIRROR

[76] Inventors: John J. Cululi, 2315 Kemmerer St., Bethlehem, Pa. 18017; Glenn R. Ash, 173 Ridge St., Emmaus, Pa. 18049

[22] Filed: Feb. 19, 1975

[21] Appl. No.: 551,048

[52] U.S. Cl. ............................... 350/307; 248/479
[51] Int. Cl.² ....................... G02B 5/08; A47G 1/24
[58] Field of Search ............ 350/307, 302; 248/480, 248/473, 474, 475 R, 476, 479, 488; 280/289

[56] References Cited
UNITED STATES PATENTS
516,910    3/1894    Bucherer ........................... 350/307

FOREIGN PATENTS OR APPLICATIONS
918,735    10/1954    Germany ........................... 350/307

*Primary Examiner*—John K. Corbin
*Assistant Examiner*—Jon W. Henry
*Attorney, Agent, or Firm*—Watson, Cole, Grindle & Watson

[57] ABSTRACT

A rear view mirror mounted on either one of the frame bars or the frame head of a bicycle in full view of the rider's line of vision and at a sufficient elevation as to facilitate an unobstructed view by the rider of objects behind him. The mirror is clamped in place to permit adjustment thereof about a transverse axis.

11 Claims, 15 Drawing Figures

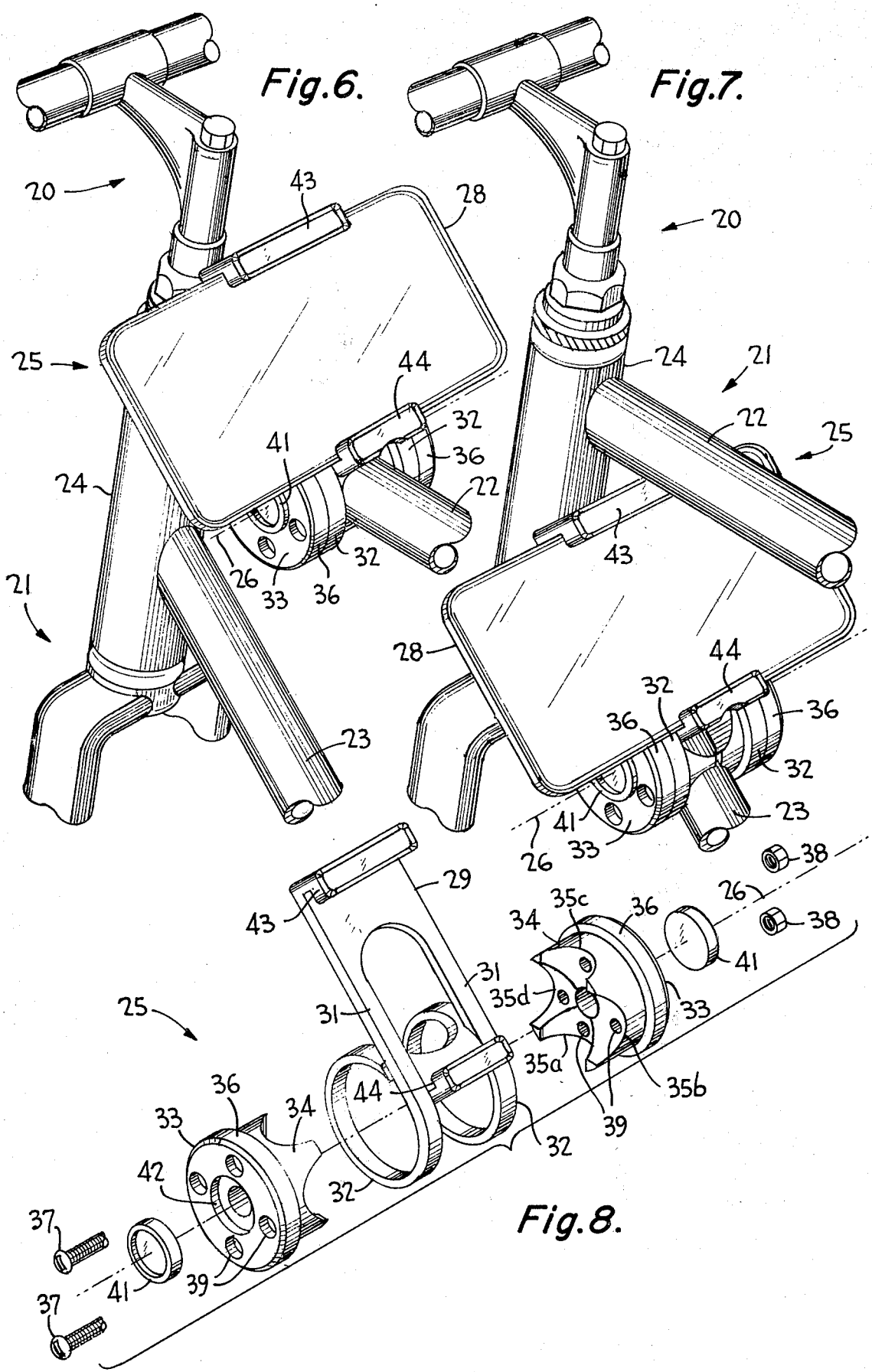

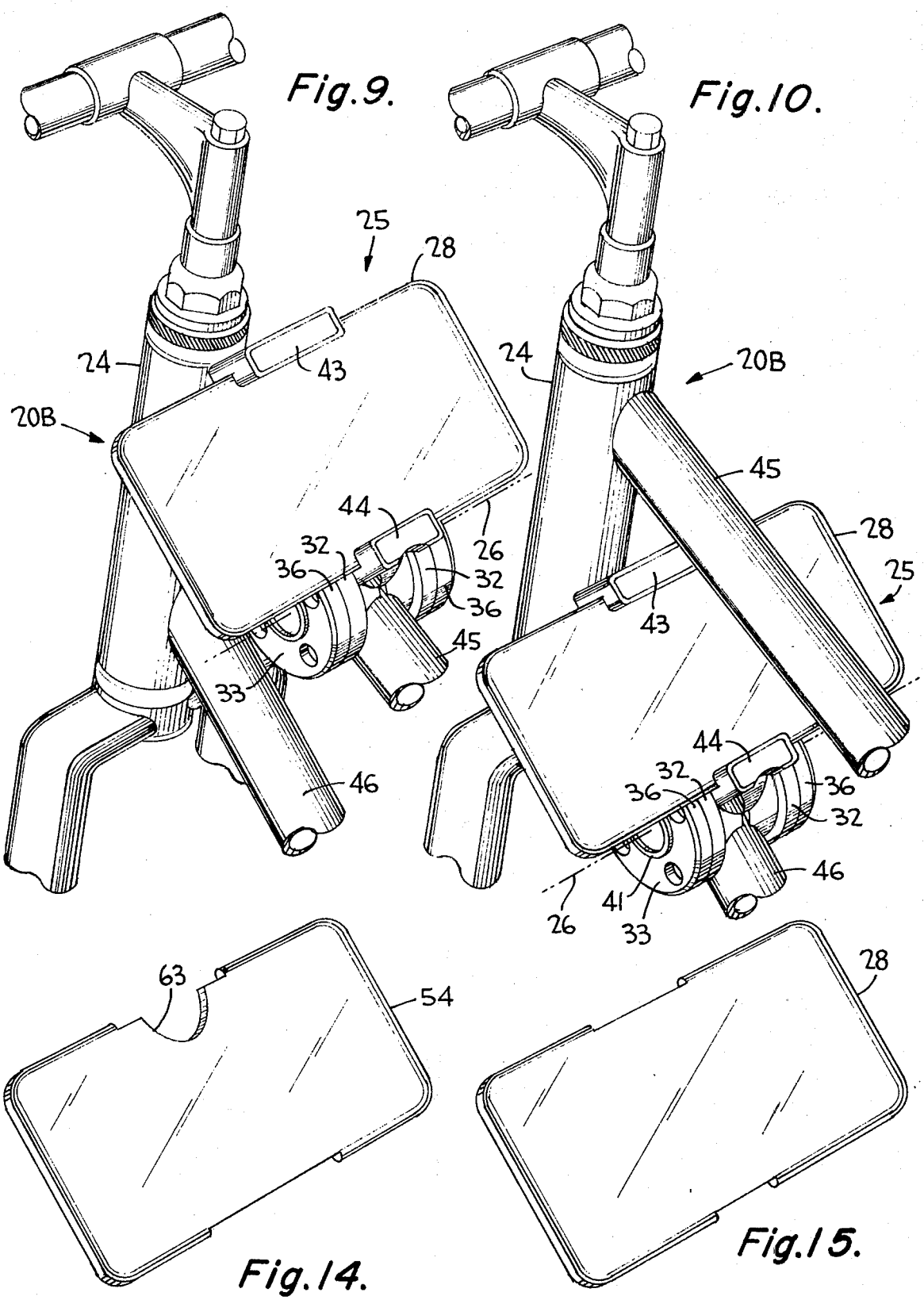

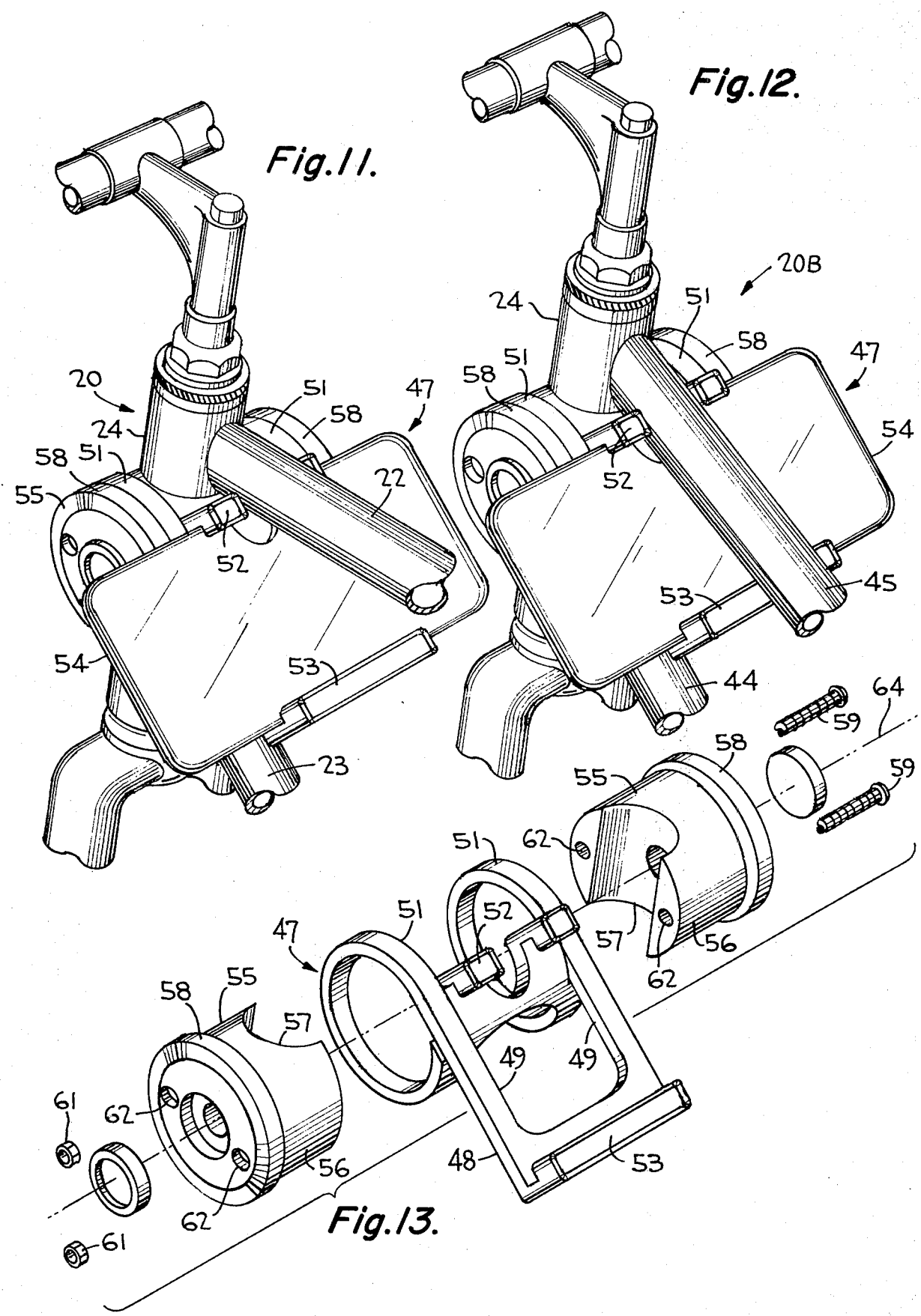

BICYCLE FRAME MOUNTED REAR VIEW MIRROR

BACKGROUND OF THE INVENTION

Field of the Invention

This invention relates generally to bicycles or other velocipedes, and more particularly to a bicycle having an adjustable mirror mounted on one of the frame bars or frame head thereof to establish a line of vision from the rider's eyes to points behind him while traveling.

Mirrors mounted on the handlebars of all types of velocipedes, especially bicycles, have been known for some time. Such handlebar-mounted mirrors, however, present a safety hazard because they waver from side to side due to the side to side movement of the handlebars necessitated in controlling the vehicle.

OBJECTS AND SUMMARY OF THE INVENTION

It is therefore an object of the present invention to avoid the above-noted drawbacks in handlebar-mounted mirrors by locating a mirror in a more stable location on one of the frame members or head member of the bicycle so as to be adjustable about a transverse axis into the rider's line of vision thereby permitting the rider to view objects to his rear while operating the bicycle.

Another object of the invention is to provide such a frame mounted mirror for a bicycle wherein the mirror assembly includes a resilient clip member for supporting a flat plane mirror, and clamp members securing the clip onto one of the frame members or head member of the bicycle in a manner to permit easy and effective adjustment of the mirror about the transverse axis.

A further object of the present invention is to provide such a mirror assembly wherein the clip member includes leg members having ring portions located on opposite sides of the frame or head member of the bicycle, such ring portions cooperating with the clamps and rotatable relative thereto so as to effect the necessary adjustment.

Other objects, advantages and novel features of the invention will become more apparent from the following detailed description of the invention when taken in conjunction with the accompanying drawings.

BRIEF DESCRIPTION OF THE DRAWINGS

FIGS. 6 and 7 are partial perspective views of frame mounted mirror assemblies respectively mounted on the top bar of a male rider's style bicycle and the lower diagonal bar of such bicycle;

FIG. 8 is an expanded perspective view showing details of the bar mounted style mirror;

FIGS. 9 and 10 are partial perspective views of a female rider's style bicycle with the frame mounted mirror assemblies mounted in place respectively on the top diagonal and the lower diagonal bars thereof;

FIGS. 11 and 12 are partial perspective views of a male rider's style bicycle and a female rider's style bicycle with the frame mounted mirror assemblies mounted in place on the frame head members thereof;

FIG. 13 is an expanded perspective view of the details of the head mounted style mirror assembly; and FIGS. 14 and 15 are perspective views of flat plane mirrors respectively for the head mounted style mirror and for the bar mounted style mirror.

DETAILED DESCRIPTION OF THE INVENTION

Figure 1:
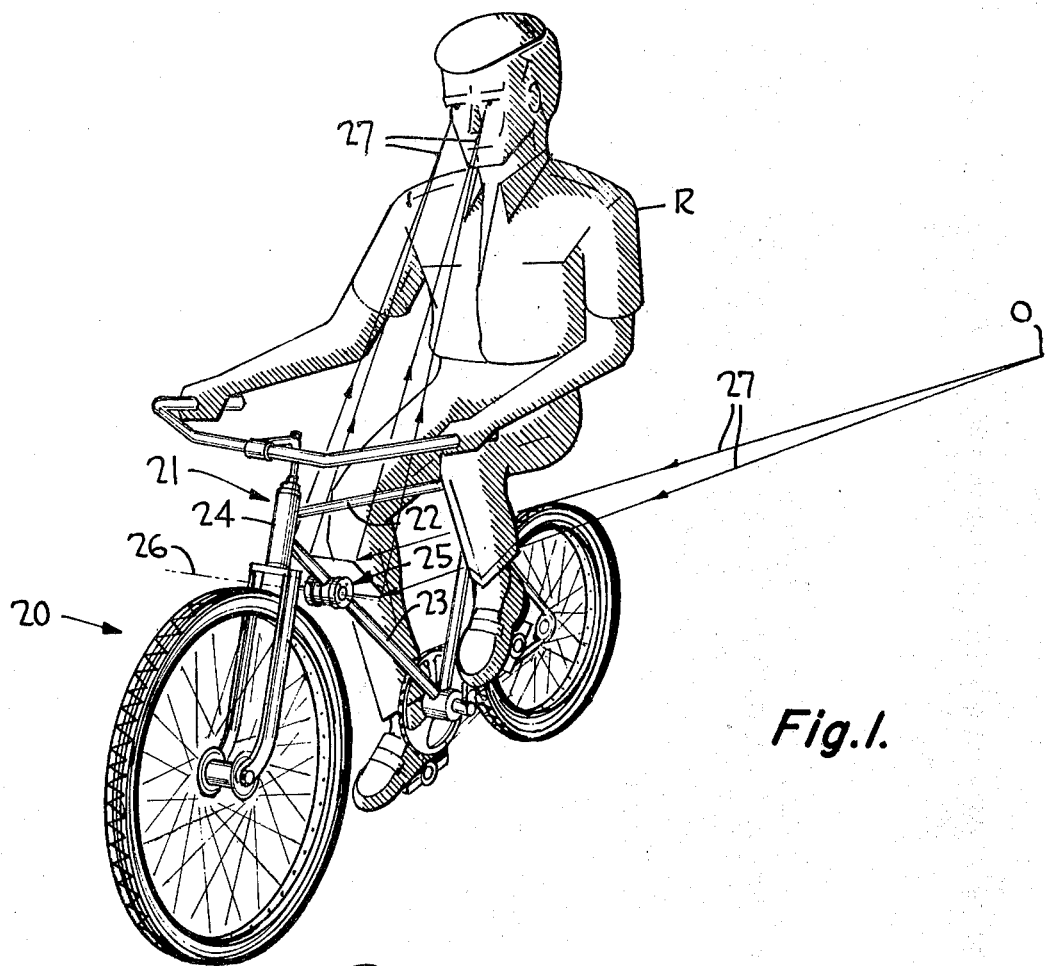
FIGS. 1 and 2 are perspective views of a bicycle having a frame mounted rear view mirror illustrating riding postures respectively when touring and racing the bicycle.

In the drawings wherein like reference characters refer to like and corresponding parts throughout the several views, a typical touring style bicycle is shown generally at 20 in FIG. 1 as including a frame 21 having an upper longitudinal bar member 22 and a forward diagonal bar member 23, such bar members being interconnected at their forward ends to a head member 24. Frame 21 is supported by spoked wheels, the forward one of which is controlled by means of a handlebar in the normal manner.

Figure 2:
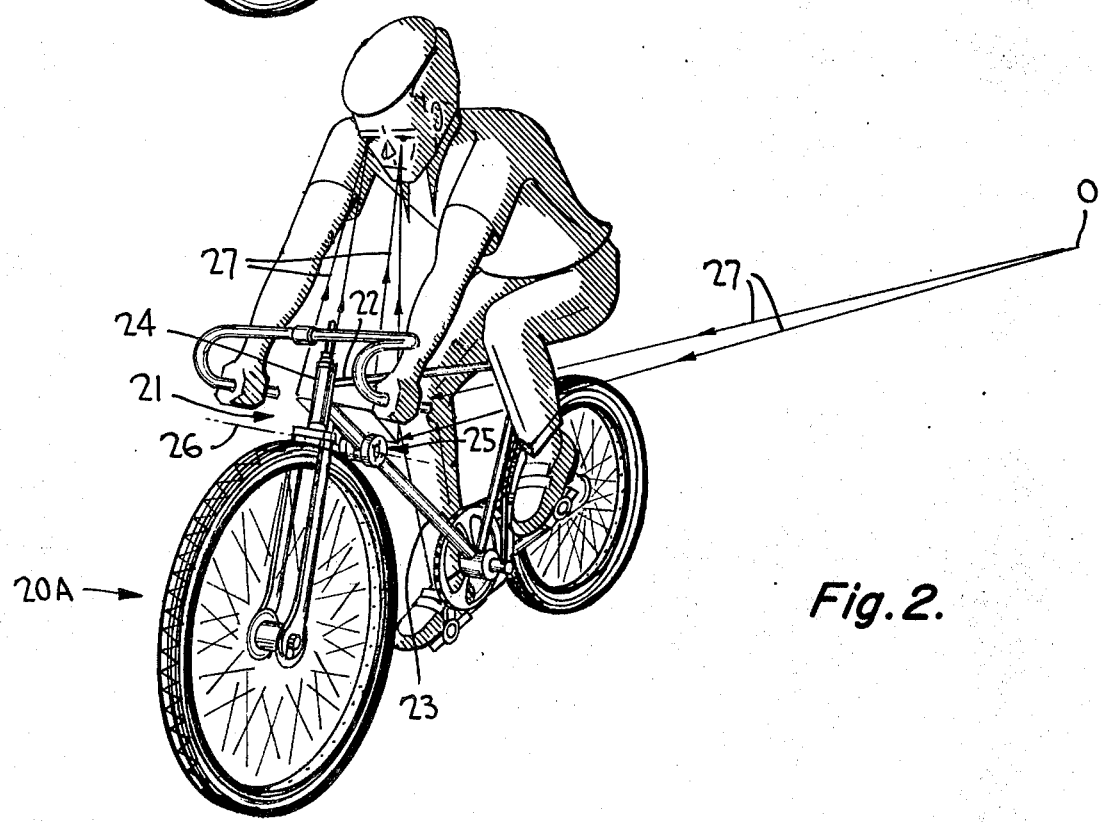

Details of bicycles disclosed herein will not be described since they are all standard bicycles with the details thereof forming no part of the present invention. The only difference between bicycle 20 shown in FIG. 1 and bicycle 20A shown in FIG. 2 is that the former illustrates a touring style bicycle while the latter illustrates a racing style bicycle. They are otherwise the same, and frame mounted mirror assemblies 25 forming a part of this invention are respectively mounted in place on diagonal bar members 23 as shown in the drawings. The mirrors of both assemblies are capable of being adjusted about transverse axes 26 thereof in a manner to be hereinafter described. The mirrors of both assemblies are therefore adjustable so as to reflect an object O from behind the rider into his line of sight, as shown by lines 27, for both styles of bicycles shown in FIGS. 1 and 2.

Figures 3, 4, 5:
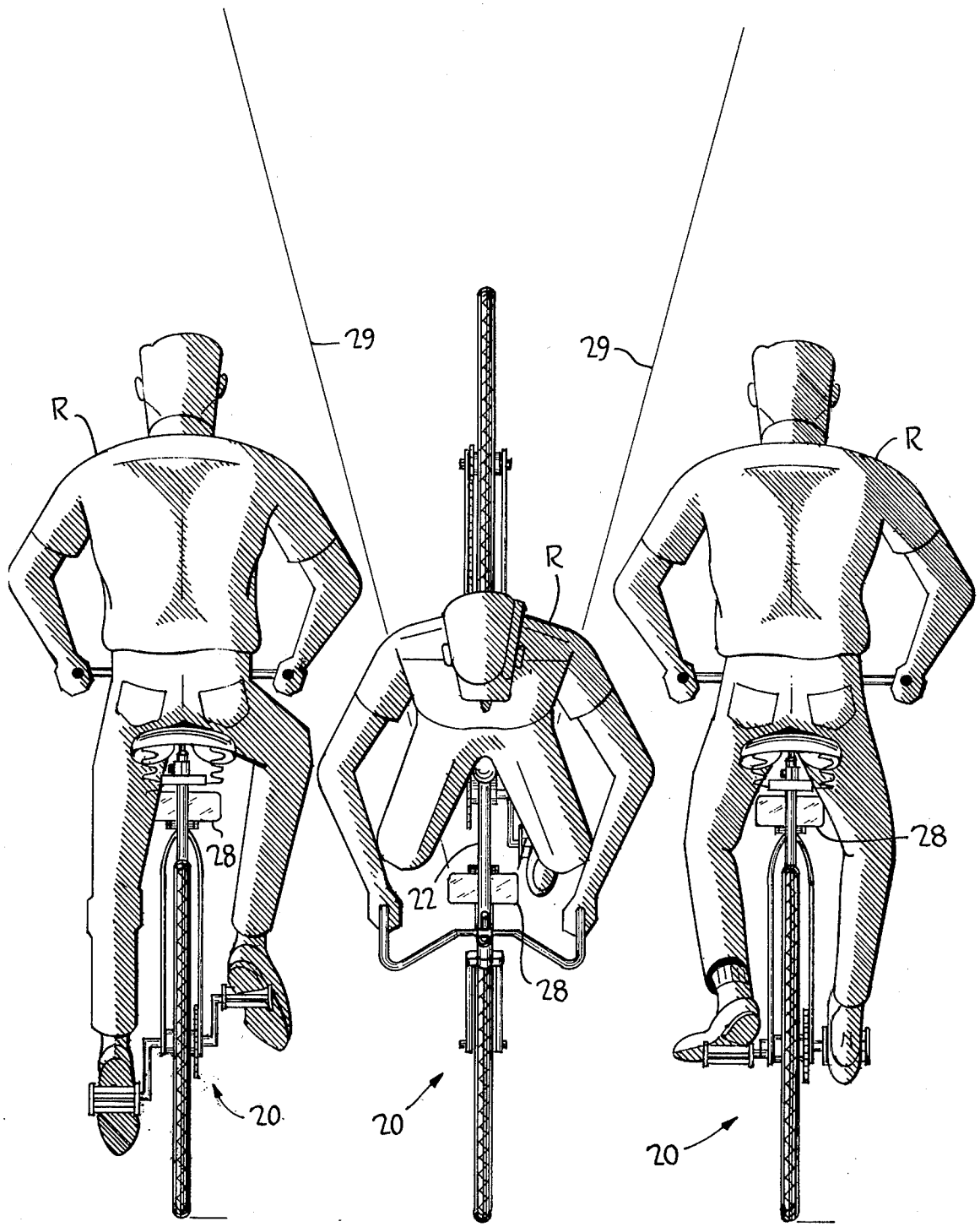
FIGS. 3 and 4, 5 are respectively top plan, and rear elevational views of the bicycle shown in FIG. 1 illustrating the rear angle vision in FIG. 3 and the maximum and minimum obstructions of the mirror respectively in FIGS. 4 and 5, while operating the bicycle.

FIG. 3 is a top plan view of bicycle 20 illustrating mirror 28 as viewed by rider R and showing the relative angle of rear view vision as by lines 29. FIG. 4 is a rear elevational view of bicycle 20 showing the maximum obstruction resulting from one position of the rider's legs when pedaling, and FIG. 5 is a similar rear elevational view showing the minimum obstruction from another position of the rider's legs when pedaling.

FIG. 6 is a partial perspective view of bicycle 20 showing mirror assembly 25 mounted in place on longitudinal bar member 22 thereof, while FIG. 7 is a similar view except that mirror assembly 25 is shown mounted on diagonal bar member 23 of the frame similarly as in FIG. 1. Both bicycles in these Figures are male rider's style bicycles having a single longitudinal bar member 22 for the frame.

FIG. 8 is an expanded perspective view of the details of mirror assembly 25 with mirror 28 thereof being omitted for the sake of clarity. Such an assembly includes a resilient clip member 29 ls aluminum, plastic or the like having leg members 31 spaced apart and located on opposite sides of the frame member to which the assembly is to be mounted as, for example, bar member 22 in FIG. 6 or bar member 23 in FIG. 7. As seen in FIG. 8 both leg members are formed as having circular bands 32 which straddle bar member 22 or 23 of the bicycle frame. The assembly further includes clamp members 33 each having circular extensions 34 with grooves 35a through 35d formed at the inner surface thereof, and peripheral flanges 36 fixed near the outer ends of these extensions. Opposite and aligned grooves 35a and 35c or 35b and 35d of one clamp member bear against one side of circular frame member 22 or 23, and a similar pair of aligned grooves bear against the opposite side of such member after these clamp member extensions are received within circular bands 32. As shown in FIGS. 6 and 7, flanges 36 of the clamp members bear against bands 32 of the clip member when the mirror assembly is mounted in place on one of the frame members. Screw fasteners such as threaded bolts 37 and cooperating nuts 38 are therefore used for securing the clamp members and clip member in place as the bolts are extended through suitable openings 39 provided in the clamp members. Moreover, reflector discs 41 may be fitted within suitable cutouts 42 provided in the clamp members for providing additional safety reflectors for the bicycle. The flat plane mirror 28 (see also FIG. 15) may be located in place and supported on the clip member between upper and lower brackets 43 and 44 thereof by simply slightly bending the clip member so as to move these brackets slightly outwardly of one another. The clip member may then be installed over one of the frame members, and the mirror may be adjusted about its transverse axis 26 by simply shifting the clip member forwardly or rearwardly so as to cause its band members to rotate relative to clamp members 33.

FIGS. 9 and 10 are partial perspective views of a female rider's style bicycle 20B having a frame member including upper and lower diagonal bar members 45 and 46, respectively. Similarly as in FIGS. 1 and 2, the forward ends of these bar members are connected to head member 24. In FIG. 9 mirror assembly 25 is shown mounted in place on top diagonal bar member 45, and in FIG. 10 the mirror assembly in shown mounted in place on bottom diagonal bar member 46 of the frame. The mirror assemblies comprise those elements earlier described with reference to FIG. 8, and are mounted in place similarly as in FIGS. 6 and 7.

FIG. 11 is a partial perspective view of a male rider's style bicycle 20 also shown in FIG. 6, and FIG. 12 is a partial perspective view of a female rider's style bicycle also shown in FIGS. 9 and 10. A frame mounted mirror assembly 47 is similar to the aforedescribed mirror assembly 25 except that the assembly in FIGS. 11 and 12 is shown mounted in place on head member 24 of the bicycle frame.

Referring to FIG. 13, mirror assembly 47 comprises a clip member 48 similar to clip member 29 described for mirror assembly 25 except that clip member 48 is disposed oppositely as compared to member 29. Otherwise, this clip member has leg members 49 terminating in circular bands 51 which are made to lie on opposite sides of head member 24. The clip member likewise has upper and lower brackets 52 and 53 for supporting a flat plane mirror 54 (see also FIG. 14) as the clip member is bent slightly to move its brackets slightly away from one another so that upon release thereof the mirror will be securely clamped in place. Mirror assembly 47 further comprises clamp members 55 each having a circular extension 56 with a groove 57 at the inner surface thereof and a peripheral flange 58 fixed near the outer end thereof. These extensions are therefore slid within the bands from opposite sides thereof until grooves 57 embrace opposite sides of head member 24 and until flanges 48 bear against the outer ends of bands 51. The clamp members are thereafter secured together by fasteners such as threaded bolts 59 and nuts 61, the bolts extending through suitable openings 62 provided in the clamp members. In FIG. 14 it can be clearly seen that mirror 54 is provided with a small cutout portion 63 so as to avoid interference with bar member 22 or 45 of the bicycle frame during adjustment of the mirror toward such bar members. Such adjustment is easily effected as the mirror is shifted about transverse axis 64 of the assembly, clip member 48 rotating relative to the clamp members during such adjustment.

From the foregoing, it can be seen that a mirror assembly is mounted on the frame of a bicycle in such a manner as to avoid interference with the rider while at the same time establishing a line of sight to his rear while avoiding a mounting of such mirror on the bicycle handlebars as in the past. The mirror assembly can be mounted in place for adjustment about its transverse axis on either the upper or lower bar members or the diagonal member of the frame, or on the frame head member. The flat plane mirror should be shatterproof, withstand normal abuse and be lightweight while at the same time have substantially rounded corners for safety reasons. The mirror is retained in a stable position and permits sufficient angular adjustment about its transverse axis.

Obviously, many modifications and variations of the present invention are made possible in the light of the above teachings. It is therefore to be understood that within the scope of the appended claims the invention may be practiced otherwise than as specifically described.

What is claimed is:

1. A frame mounted rear view mirror for a bicycle having a frame, wheels rotatably mounted on said frame, and handle bars disposed above said frame, said frame having at least one longitudinal bar member and at least one diagonal bar member, a head bar member being disposed above the forward one of said wheels and being connected to the forward ends of said longitudinal and diagonal bar members, the improvement comprising a mirror assembly including mirror mounting means connected to one of said longitudinal, said diagonal and said head members for pivotal movement about an axis transverse to said longitudinal member, said mounting means including a mirror support element defining a mirror support surface lying at an angle facing upwardly and rearwardly and being disposed wholly below said handle bars, said mirror assembly further including a flat plane mirror mounted on said support element against said mirror support surface, whereby said mirror assembly avoids any interference with a bicycle operator and establishes a line of sight to the operator's rear while avoiding potential safety hazards by being mounted below said handle bars and out of the immediate vicinity thereof.

2. The rear view mirror according to claim 1, wherein said mirror support element of said mirror assembly comprises a resilient clip member having leg members disposed on opposite sides of said one member, and clamp members secured together holding said clip member legs onto said one member.

3. The rear view mirror according to claim 1, wherein said mirror assembly is mounted on said longitudinal member of the bicycle.

4. The rear view mirror according to claim 1, wherein said mirror assembly is mounted on said diagonal member of the bicycle.

5. The rear view mirror according to claim 1, wherein said mirror assembly is mounted on said head member of the bicycle.

6. The rear view mirror according to claim 2, wherein said clamp members have grooves at the inner surfaces thereof so as to receive said one member at opposite sides thereof, and fastening means being provided to secure said clamp members together.

7. The rear view mirror according to claim 6, wherein said leg members of said clip member lying on opposite sides of said one member has circular bands, said clamp members having inward extensions of circular cross-section and outwardly extending flanges at the outer ends thereof, said circular bands surrounding said extensions of said clamp members and bearing against said flanges thereof, whereby said clip member may be rotatably adjusted relative to said clamp member.

8. The rear view mirror according to claim 7, wherein said clip member has upper and lower gripping flanges for retaining said mirror in place therebetween.

9. In a bicycle having a frame, wheels rotatably mounted on said frame, handle bars disposed above said frame, and said frame including at least one longitudinal bar member and at least one diagonal bar member, a head bar member being disposed above the forward one of said wheels and being connected to the forward ends of said longitudinal and diagonal bar members, a mirror assembly mounted on one of said longitudinal, said diagonal and said head members for pivotal movement about a central axis of said assembly, said mirror assembly including a resilient clip member having a pair of legs for straddling said one bar member, a flat plane mirror mounted on said clip member, clamp members secured together for holding said clip member legs onto said one member, said clamp members having grooves at the inner surfaces thereof for the reception of said one member at opposite sides thereof, fastening means provided to secure said clamp members together, said mirror disposed below said handle bars and at an angle facing upwardly and rearwardly so as to facilitate rear vision by a bicycle occupant, whereby said mirror assembly avoids any interference with the bicycle occupant and establishes a line of sight to the occupant's rear while avoiding potential safety hazards by being mounted below said handle bars and out of the immediate vicinity thereof.

10. The mirror assembly of claim 9, wherein said leg members have circular bands, said clamp members have inward extensions of circular cross-section and outwardly extending flanges at the outer ends thereof, and said circular bands surrounding said extensions and bearing against said flanges thereof, whereby said clip member may be rotatably adjusted relative to said clamp member.

11. The mirror assembly according to claim 10, wherein said clip member has opposed gripping flanges for retaining said mirror in place therebetween.

* * * * *